(12) United States Patent
Maligie et al.

(10) Patent No.: US 6,440,566 B1
(45) Date of Patent: Aug. 27, 2002

(54) METHOD OF MOLDING OR CURING A RESIN MATERIAL AT HIGH TEMPERATURES USING A MULTILAYER RELEASE FILM

(75) Inventors: John Maligie, Long Beach; Thomas Malter, Huntington Beach, both of CA (US)

(73) Assignee: Airtech International, Inc., Huntington Beach, CA (US)

( * ) Notice: Subject to any disclaimer, the term of this patent is extended or adjusted under 35 U.S.C. 154(b) by 0 days.

(21) Appl. No.: 09/408,909

(22) Filed: Oct. 1, 1999

Related U.S. Application Data
(60) Provisional application No. 60/102,682, filed on Oct. 1, 1998.

(51) Int. Cl.$^7$ .............................. B32B 27/36; B27N 3/18
(52) U.S. Cl. ...................... 428/412; 428/516; 428/520; 428/476.9; 428/475.8; 428/483; 428/476.1; 428/476.3; 428/474.4; 156/244.11; 156/325; 156/326; 156/327; 427/508; 427/487; 264/319; 264/330; 264/331.4; 264/331.15; 264/331.18; 264/331.21
(58) Field of Search ................................ 428/412, 516, 428/520, 476.9, 475.8, 483, 476.1, 476.3, 474.4; 156/244.11, 325, 326, 327; 427/508, 487; 264/319, 330, 331.11, 331.15, 331.18, 331.21

(56) References Cited

U.S. PATENT DOCUMENTS

| | | | |
|---|---|---|---|
| 3,355,347 A | 11/1967 | Habermann | 428/4.22 |
| 4,058,647 A | 11/1977 | Inoue et al. | 428/474 |
| 4,233,367 A | 11/1980 | Ticknor et al. | 428/476.1 |

(List continued on next page.)

FOREIGN PATENT DOCUMENTS

| | | |
|---|---|---|
| EP | 0 016 617 A1 | 10/1980 |
| EP | 0 027 191 A1 | 4/1981 |
| EP | 0 035 392 A1 | 9/1981 |

(List continued on next page.)

OTHER PUBLICATIONS

"Release Films Catalog", International Plastics Products, Inc., Carson California, (XP–002129652), pp. 12, Nov. 1986.

(List continued on next page.)

*Primary Examiner*—Leszek Kiliman
(74) *Attorney, Agent, or Firm*—Senniger, Powers, Leavitt & Roedel

(57) ABSTRACT

This invention relates to a method for molding or curing a resin material using a multilayer release film as a barrier at the surface of the resin material. In one embodiment, the method comprises the surface of the resin material being in contact with the release film at a temperature of at least about 350° F. (about 180° C.). Here, the release film is non-oriented and comprises: (1) an enhancement layer which comprises a thermoplastic material; and (2) a first release layer which has a composition that is different from the enhancement layer, comprises a polymeric material, and is releasable from the resin material after the resin material is molded or cured.

This invention also relates to a release film that may be used, for example, with the above method. In one embodiment, the release film comprises 5 layers in the following order: (1) a first release layer which comprises polymethylpentene; (2) a first tie layer which comprises (i) polyethylene or modified polyethylene, and (ii) polypropylene or modified polypropylene; (3) an enhancement layer which comprises polyamide; (4) a second tie layer which comprises (i) polyethylene or modified polyethylene, and (ii) polypropylene or modified polypropylene; and (5) a second release layer which comprises polymethylpentene.

36 Claims, 2 Drawing Sheets

U.S. PATENT DOCUMENTS

| | | | | |
|---|---|---|---|---|
| 4,361,628 A | 11/1982 | Krueger et al. | ......... | 428/475.8 |
| 4,444,826 A | 4/1984 | Sasaki et al. | ............... | 428/216 |
| 4,444,829 A | 4/1984 | Bollen et al. | ............... | 428/220 |
| 4,469,753 A | 9/1984 | Yoshimura et al. | ...... | 428/475.8 |
| 4,614,667 A | 9/1986 | Larson et al. | ............... | 427/508 |
| 4,668,571 A | 5/1987 | Moriarty, Jr. | ............... | 428/327 |
| 4,677,017 A | 6/1987 | DeAntonis et al. | ......... | 428/214 |
| 4,814,231 A | 3/1989 | Onohara et al. | ......... | 428/425.5 |
| 4,834,721 A | 5/1989 | Onohara et al. | ............ | 604/266 |
| 4,857,409 A | 8/1989 | Hazelton et al. | ............ | 428/494 |
| 4,948,641 A | 8/1990 | Shantz et al. | ............. | 428/35.7 |
| 5,002,833 A | 3/1991 | Kinsey, Jr. et al. | ...... | 428/475.8 |
| 5,028,478 A | 7/1991 | Odagiri et al. | ............. | 442/248 |
| 5,055,355 A | 10/1991 | DeAntonis et al. | ...... | 428/476.3 |
| 5,057,372 A | 10/1991 | Imfeld et al. | ............... | 428/412 |
| 5,061,751 A | 10/1991 | Patton | ......................... | 525/57 |
| 5,079,052 A | 1/1992 | Heyes et al. | ............... | 428/35.3 |
| 5,080,979 A * | 1/1992 | Shigemoto | .................. | 428/520 |
| 5,102,734 A | 4/1992 | Marbrow et al. | ........... | 428/349 |
| 5,106,692 A | 4/1992 | Shigemoto | .................. | 428/412 |
| 5,108,532 A | 4/1992 | Thein et al. | ................ | 156/332 |
| 5,114,765 A | 5/1992 | Inada et al. | ................ | 428/35.7 |
| 5,123,985 A | 6/1992 | Evans et al. | ................ | 156/213 |
| 5,139,878 A | 8/1992 | Kim et al. | ................... | 428/421 |
| 5,173,359 A | 12/1992 | Toyoshima et al. | ......... | 428/229 |
| 5,189,097 A | 2/1993 | LaFleur et al. | ................ | 525/57 |
| 5,190,809 A | 3/1993 | Marissen et al. | ........... | 428/225 |
| 5,225,268 A | 7/1993 | Shibata et al. | .............. | 428/220 |
| 5,227,255 A | 7/1993 | Akao | ....................... | 428/476.1 |
| 5,232,784 A | 8/1993 | Kim | ......................... | 428/451 |
| 5,261,993 A | 11/1993 | Dahlgren | .................... | 156/382 |
| 5,274,026 A | 12/1993 | Benedikt et al. | ............ | 524/553 |
| 5,288,548 A | 2/1994 | Weber | ...................... | 428/315.9 |
| 5,302,107 A | 4/1994 | Dahlgren | .................... | 425/388 |
| 5,344,691 A | 9/1994 | Hanschen et al. | .......... | 428/152 |
| 5,368,916 A | 11/1994 | Fujimoto et al. | ............ | 428/215 |
| 5,414,043 A | 5/1995 | Hesse et al. | ................... | 525/64 |
| 5,415,935 A | 5/1995 | Pankratz | .................... | 428/352 |
| 5,534,593 A | 7/1996 | Freidman | ................... | 535/240 |
| 5,565,267 A | 10/1996 | Capote et al. | ............... | 428/344 |
| 5,589,028 A | 12/1996 | Robinson et al. | ........ | 156/306.6 |
| 5,601,770 A | 2/1997 | Maligie | ................. | 264/172.19 |
| 5,658,630 A | 8/1997 | Shizukuda et al. | ....... | 428/40.1 |
| 5,665,464 A | 9/1997 | Takayasu et al. | ........ | 428/312.2 |
| 5,725,940 A | 3/1998 | Sakai et al. | .............. | 428/318.6 |
| 5,728,469 A | 3/1998 | Mann et al. | ................ | 428/418 |
| 5,744,816 A | 4/1998 | Butler | ................... | 252/182.18 |
| 5,756,580 A | 5/1998 | Natori et al. | ............... | 525/100 |
| 5,766,744 A | 6/1998 | Fanselow et al. | ........... | 428/213 |
| 5,783,635 A | 7/1998 | Akiyama et al. | ............ | 525/168 |
| 5,792,549 A | 8/1998 | Wilkie | ........................ | 428/215 |
| 5,795,649 A | 8/1998 | Cosentino et al. | ......... | 428/336 |
| 5,807,632 A | 9/1998 | Pedginski et al. | .......... | 428/352 |
| 5,817,386 A | 10/1998 | Adamko et al. | ........... | 428/41.3 |
| 5,817,736 A | 10/1998 | von Gentzkow et al. | ... | 528/108 |
| 5,834,547 A | 11/1998 | Takabatake et al. | ........ | 524/321 |
| 5,858,550 A * | 1/1999 | Tsai | ........................ | 428/474.4 |
| 5,932,352 A | 8/1999 | Higgins | ................... | 428/423.1 |

FOREIGN PATENT DOCUMENTS

| | | |
|---|---|---|
| EP | 0 151 873 A2 | 8/1985 |
| EP | 0 219 198 A1 | 4/1987 |
| EP | 0 336 704 A2 | 4/1989 |
| EP | 0 334 293 A2 | 9/1989 |
| EP | 0 342 897 A2 | 11/1989 |
| EP | 0 364 956 A1 | 4/1990 |
| EP | 0 457 598 A2 | 11/1991 |
| EP | 0 460 393 A1 | 12/1991 |
| EP | 0 595 220 A2 | 5/1994 |
| EP | 0 595 220 A3 | 5/1994 |
| WO | 92/15626 | 9/1992 |
| WO | 97/47468 | 12/1997 |
| WO | 98/06573 | 2/1998 |
| WO | 98/10724 | 3/1998 |
| WO | WO 98/34784 A1 | 8/1998 |

OTHER PUBLICATIONS

Release Films Catalog, International Plastics Products, Inc., Carson California, (XP–002129654), pp. 6A, Jul., 1985.

Abstract: Mitsubishi Gas Chem Ind. Co., Ltd. (XP–002129655), May 1982.

International Search Report PCT/US 99/23226, Feb. 16, 2000.

John H. Briston, Plastics Films (co–published by Longman Scientific and technical and John Wiley and Sons, 3rd ed. 1988), p. 331–35, 420–421 and 424.

Michael C.Y. Niu, Resin Airframe Structures—Practical Design Information and Data (Conmilt Press, Ltd., hong Kong, 1992), pp. 176–237.

Zeke Smith, Understanding Aircraft Resin Construction (Aeronaut Press, napa, FL 1996), pp. 14–1 to 14–10.

Airtech Advanced Materials Group Preliminary Data Sheet, "Dahlar® 4601 Release Film", Oct. 4, 1999.

Hexcel/Ciba Product Data Sheet, "F584™ Resin Systems For Advanced Composites", Dec. 1998.

DuPont's Bynel® Series 4100 Data Sheet, which includes data for Bynel 41E558.

DuPont's Bynel® Series 5000 Data Sheet, which includes data for Bynel 50E571.

Mitsui Plastics Brochure Page, Oct. 1982, which includes data for Mitsui's MX002.

Mitsui Chemicals Data Sheet, "L–LDPE Type Admer Grade for NY AT1048A".

Mitsui Chemicals Data Sheet, "ADMER Grades For PP// EVOH Bottle", which includes data for Mitsui's QB510A and QF551A.

BASF Product Information Sheet, "Ultramid® B Copolyamide 6 (PA) Film Grades", Jan. 1998, which includes data for BASF's B36.

Chevron's Data Sheet "PE 1122 Clarity, Liner Grade Film Resin", CCO 1122–486.

* cited by examiner

METHOD OF MOLDING OR CURING A RESIN MATERIAL AT HIGH TEMPERATURES USING A MULTILAYER RELEASE FILM

CROSS REFERENCE TO RELATED APPLICATIONS

This patent claims priority from U.S. Provisional Application Serial No. 60/102,682, which was filed on Oct. 1, 1998. U.S. Provisional Application Serial No. 60/102,682 is hereby incorporated by reference into this patent.

BACKGROUND OF THE INVENTION

This invention relates generally to a novel method for molding or curing a resin material at a temperature of at least about 120° F. (about 50° C.), and more particularly at least about 350° F. (about 180° C.), using a multilayer release film as a barrier at the surface of the resin material. This invention also generally relates to a novel release film which may be used with such a method.

There is a significant need in a variety of industries for producing strong, durable, light weight structural parts. This is particularly true in the automotive, aircraft, and aerospace industries, where these parts play an important role in producing energy efficient vehicles, airplanes, and spacecraft. In response to this need, many manufacturers have turned to developing resin materials which match or exceed the strength and durability of the traditionally used metal parts.

Release films (also known as "parting films" or "barrier films") play an important role in molding and curing processes of the parts made from resin materials. Release films, for example, are used to separate a mold (or "tool") from the resin material so that the material does not stick to the mold. Such molding and curing processes often are performed at temperatures of about 350° F. (about 180° C.) or greater, and, therefore, require the release film to be heat stable at such temperatures.

In many traditional applications, the release films used in the curing and molding processes of resin materials have been monolayer films prepared from various commercially available polymeric thermoplastic resins, such as fluoropolymer resins. These monolayer films, however, generally exhibit less-than-satisfactory physical characteristics (e.g., tensile strength, tear strength, and elongation) and/or tend to be costly. In some instances, inexpensive monolayer films having unsuitable release characteristics (but otherwise desirable physical characteristics) have been coated with a release agent to impart the desired release characteristics to the film. Traditionally used release agents include, for example, siloxanes, silicones, diethylene glycol monostearate, hydrogenated castor oil, stearic acid, oleic acid, zinc stearate, calcium stearate ethylene bis (stearamide), oleyl palmitamide, microcrystalline wax, paraffin wax, carnauba wax, spermaceti wax, cellophane, cellulose acetate, sodium alginate, and combinations thereof. Use of such release agents, however, is often undesirable because the release agents tend to create a risk of contamination to the resin material being cured or molded. It also has been reported that some release agents can create a health hazard. See Higgins, U.S. Pat. No. 5,932,352.

In response to the deficiencies of monolayer release films, multilayer release films have begun to be developed. Many of these films reportedly tend to be cheaper and exhibit better physical characteristics than the traditional monolayer films.

Multilayer release films, for example, have reportedly been particularly useful in molding and curing processes of sheet molding compounds. See, e.g., Maligie, U.S. Pat. No. 5,601,770. Such processes, however, are generally performed at temperatures of from 175 to 340° F. (80 to 170° C.). See, e.g., Akiyama, et al., U.S. Pat. No. 5,783,635 (176 to 320° F.; 80 to 160° C.); Takabatake, et al., U.S. Pat. No. 5,834,547 (248 to 302° F.; 120 to 150° C.); Butler, U.S. Pat. No. 5,744,816 (176 to 212° F.; 80 to 100° C.); Hesse, et al., U.S. Pat. No. 5,414,043 (248 to 338° F.; 120 to 170° C.). These temperatures are less than the temperatures used in many other resin molding and curing processes, and, therefore, have less stringent heat-stability requirements for the release films than do the higher temperature processes.

In U.S. Pat. No. 5,080,979, Shigemoto et al. disclose multilayer release films having a polyolefin layer sandwiched between two polymethylpentene layers. Although the specific films disclosed by Shigemoto et al. may be used in some resin curing and molding processes, it has been reported that such films lose their dimensional stability at temperatures of about 350° F. (about 180° C.) and greater. See Tsai et al., U.S. Pat. No. 5,858,550. Thus, they generally must be used at lower temperatures, therefore necessitating longer periods of time to cure or mold the resin materials.

One approach which reportedly addresses the problems associated with Shigemoto et al.'s release films is disclosed by Tsai et al. in U.S. Pat. No. 5,858,550. Tsai et al. disclose that certain multilayer films (e.g., a 5-layer film having two exterior layers of polymethylpentene, a core layer of nylon 6, and an adhesive layer of maleic anhydride modified polypropylene between the core layer and each exterior layer) may be used as release films when preparing printed circuit boards at temperatures of at least about 350° F. (about 180° C.) if the films are first uniaxially or biaxially oriented (i.e., stretched in a certain direction(s)). In particular, Tsai et al. disclose using either uniaxially or biaxially oriented films, especially uniaxially oriented films produced at stretch ratios of from 2:1 to 6:1. Tsai et al. define this "stretch ratio" as the increase of dimension in the direction of the stretch (e.g., a film having a stretch ratio of 2:1 has its length doubled during the stretching process). According to Tsai et al., such stretching may be accomplished by passing the film over a series of preheating and heating rolls. In such an apparatus, the heated film moves through a set of nip rolls downstream at a faster rate than the film entering the nip rolls at an upstream location. The change of rate is compensated for by stretching in the film. Although Tsai et al. report that this stretching step imparts certain characteristics to the release film that are necessary for the film to function properly at temperatures of at least about 350° F. (about 180° C.), inclusion of such a step adds to the costs associated with manufacturing the release film.

SUMMARY OF THE INVENTION

Among the objects of this invention is the provision of a novel method for curing or molding resin materials which employs a release film that has one or more of the following characteristics: (1) it may be used with typical resin molding and curing processes at temperatures of at least about 350° F. (about 180° C.); (2) it is economical to manufacture, and preferably less costly to prepare than the release films that traditionally have been used to mold and cure resin materials at temperatures of at least about 350° F. (about 180° C.); and (3) it may be used without having a release agent coated on its surface, thereby avoiding the risk of contamination by the release agent.

Briefly, therefore, this invention is directed to a method for molding or curing a resin material using a multilayer release film as a barrier at the surface of the resin material. In one embodiment, the method comprises the surface of the resin material being in contact with the release film at a temperature of at least about 350° F. (about 180° C.). Here, the release film is non-oriented and comprises: (1) an enhancement layer which comprises a thermoplastic material; and (2) a first release layer which has a composition that is different from the enhancement layer, comprises a polymeric material, and is releasable from the resin material after the resin material is molded or cured.

In another embodiment directed to a method for molding or curing a resin material using a multilayer release film as a barrier at the surface of the resin material, the method again comprises the surface of the resin material being in contact with the release film at a temperature of at least about 350° F. (about 180° C.). Here, the release film comprises (1) a release layer which comprises polymethylpentene; (2) an enhancement layer which comprises polyamide; and (3) a tie layer which is sandwiched between the release layer and enhancement layer and comprises (i) polyethylene or modified polyethylene, and (ii) polypropylene or modified polypropylene.

In yet another embodiment directed to a method for molding or curing a resin material using a multilayer release film as a barrier at the surface of the resin material, the surface of the resin material is contacted with a release film comprising 5 layers in the following order (1) a first release layer which comprises polymethylpentene; (2) a first tie layer which comprises (i) polyethylene or modified polyethylene, and (ii) polypropylene or modified polypropylene; (3) an enhancement layer which comprises polyamide; (4) a second tie layer which comprises (i) polyethylene or modified polyethylene, and (ii) polypropylene or modified polypropylene; and (5) a second release layer which comprises polymethylpentene.

In a further embodiment directed to a method for molding or curing a resin material using a multilayer release film as a barrier at the surface of the resin material, the surface of the resin material is contacted with a release film comprising: (1) a release layer which comprises polymethylpentene; (2) an enhancement layer which comprises polyamide; and (3) a tie layer which is sandwiched between the release layer and enhancement layer and comprises anhydride modified linear low density polyethylene and anhydride modified polypropylene.

Another object of this invention is the provision of a release film that may be used, for example, with the above-described method.

Briefly, in one embodiment, this invention is directed to a release film comprising 5 layers in the following order: (1) a first release layer which comprises polymethylpentene; (2) a first tie layer which comprises (i) polyethylene or modified polyethylene, and (ii) polypropylene or modified polypropylene; (3) an enhancement layer which comprises polyamide; (4) a second tie layer which comprises (i) polyethylene or modified polyethylene, and (ii) polypropylene or modified polypropylene; and (5) a second release layer which comprises polymethylpentene.

In another embodiment directed to a release film, the release film comprises: (1) a release layer which comprises polymethylpentene; (2) an enhancement layer which comprises polyamide; and (3) a tie layer which is sandwiched between the release layer and enhancement layer and comprises anhydride modified linear low density polyethylene and anhydride modified polypropylene.

DETAILED DESCRIPTION OF THE PREFERRED EMBODIMENTS

The present invention is directed to a method for molding or curing a resin material at temperatures of at least about 350° F. (about 180° C.) using a multilayer release film as a barrier at the surface of the resin material. This method is useful in numerous contexts. For example, in many applications, the release film is used to separate the resin material from a mold to prevent the resin material from sticking to the mold.

Figure 1:
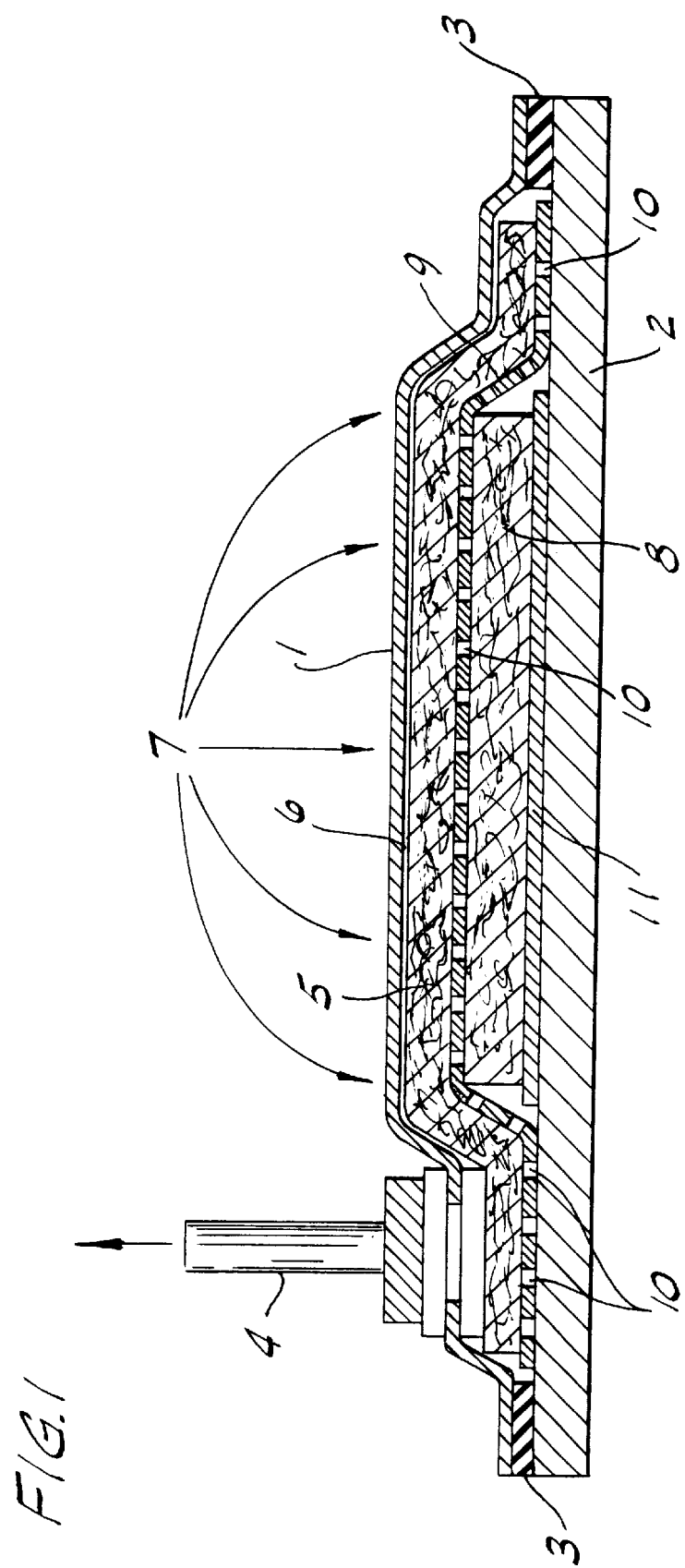
FIG. 1 is one embodiment of a vacuum bagging apparatus which may be used with the present invention.

In a particularly preferred embodiment of this invention, the release film is used in a vacuum bagging apparatus to separate a resin material from the tool, the vacuum bag, and/or other components inside the vacuum bag. One embodiment of a suitable vacuum bagging apparatus is shown in FIG. 1. In this embodiment, a vacuum bag 1, consisting of a thin pliant film membrane, is attached to a rigid mold or tool 2 with a tape of sealant putty 3. Air in the volume beneath the vacuum bag 1 is evacuated through vacuum port 4 in the vacuum bag 1. In a particularly preferred embodiment, the air is removed evenly and continuously from between the bag 1 and the tool 2 by a porous breather pad 5 to produce a volume 6 having reduced air pressure, preferably an approximately full vacuum (i.e., from about 25 to about 30 inches of Hg; or from about 84 to about 101 kPa). At the same time, air or other fluid pressure in the volume 7 above the vacuum bag 1 is applied to the top side of the vacuum bag 1. The pressure differential between volumes 6 and 7 produces mechanical pressure on the vacuum bag 1, which, in turn, acts to consolidate or bring into close contact the resin material 8 placed beneath the vacuum bag 1. A multilayer release film 9 (preferably having perforations 10) separates the resin material from the breather pad 5 (or the vacuum bag 1 if no breather pad 5 is used, such as in typical vacuum bagging apparatuses used to prepare circuit boards). A second multilayer release film 11 separates the resin material 8 from the tool 2. Example 5 further illustrates the use of such an apparatus. Vacuum bagging apparatuses are widely described in the literature. See, e.g., Dahlgren, U.S. Pat. No. 5,302,107 (incorporated herein by reference); Dahlgren, U.S. Pat. No. 5,261,993 (incorporated herein by reference); Evans et al., U.S. Pat. No. 5,123,985 (incorporated herein by reference).

It should be recognized that other types of curing and molding apparatuses may be used as well. These include, for example, press cure apparatuses, such as the one illustrated in Example 6. Press cure apparatuses are well-known in the art. See, e.g., Capote, et al., U.S. Pat. No. 5,565,267 (incorporated herein by reference); Benedikt, et al., U.S. Pat. No. 5,274,026 (incorporated herein by reference); Von Gentzkow, et al., U.S. Pat. No. 5,817,736 (incorporated herein by reference); Thein, et al., U.S. Pat. No. 5,108, 532 (incorporated herein by reference).

A wide variety of resin materials may be used with this method. As used herein, a "resin material" is a material that comprises at least one polymeric material. This method is particularly suitable for resin materials comprising a thermoset resin or thermoplastic resin which is cured or molded at temperatures of at least about 350° F. (about 180° C.). Examples of suitable thermoset resins include many phenolic resins, epoxy resins (particularly epoxy resins containing fiberglass or graphite), vinyl ester resins, polyester resins, cyanate ester resins, and bismaleimide resins. Examples of suitable thermoplastic resins include many polyester resins, polyetherketone resins, polyethylene resins, and polyether ether ketone resins. In one embodiment of this invention, the resin material comprises a block copolymer or a random copolymer comprising a thermoset resin or a thermoplastic resin. In another embodiment, the resin material comprises an elastomer comprising a thermoset resin or thermoplastic resin.

In one of the more preferred embodiments of this invention, the resin material comprises a composite material (i.e., a matrix material which is reinforced with a continuous or non-continuous filament). The reinforcement filaments in the composite material may comprise any of a number of different types of materials, including, for example, glass, carbon, aramid fibers, ceramics, and various metals. Composite materials are very well known in the art and widely available commercially. See, e.g., Marissen , et al., U.S. Pat. No. 5,190,809 (incorporated herein by reference); Toyoshima, et al., U.S. Pat. No. 5,173,359 (incorporated herein by reference); Sakai , et al., U.S. Pat. No. 5,725,940 (incorporated herein by reference); Takayasu, et al., U.S. Pat. No. 5,665, 464 (incorporated herein by reference).

It should be recognized that the article containing the resin material being cured or molded may contain one or more layers, and the composition of these layers may be the same or different. For example, the article may contain a layer of resin material having a surface which is partially or totally covered by a sheet of metal (e.g., copper, aluminum, stainless steel, etc.). Or, to illustrate further, the article may comprise a metal sheet having a partial or complete layer of resin material on one or both sides of the sheet. In most instances, at least a portion of the surface of the article is formed by the resin material. However, because the article may contain multiple materials, different regions of the surface of the article may be formed by different materials. For example, a portion of the surface may be formed by a resin material, while another portion may be formed by a metal sheet or a different resin material. An example of such an article is illustrated in Example 6.

The release film comprises at least two layers: an enhancement layer and a first release layer. The first release layer typically is the portion of the release film that is contacted with the surface of the article containing the resin material being molded or cured. In most embodiments, therefore, the first release layer consists essentially of a material which may be removed from a surface of the article after the resin material has been molded or cured. The enhancement layer, on the other hand, preferably has a composition which is different from the composition of the release layer. The enhancement layer typically provides qualities to the film which the release layer lacks. For example, many materials which exhibit suitable release characteristics exhibit inadequate tensile strength, tear strength, and/or elongation. These inadequacies, however, may be overcome by combining a layer of the material (i.e., the "release layer") with a second layer (i.e., the "enhancement layer") having better tensile strength, tear strength, and/or elongation. To illustrate, although a release layer consisting of polymethylpentene exhibits desirable release properties in many applications, it often may not be used alone for such applications because of its inadequate tensile strength and tear strength. However, if such a layer is combined with an enhancement layer consisting of, for example, polyamide 6 (also known as "poly(6-aminohexanoic acid)" or "nylon 6" or "poly(caprolactam)"), which exhibits superior tensile strength and tear strength, it becomes more useable because of the tensile strength and tear strength that the polyamide 6 layer imparts. Example 1 below provides a more detailed comparison.

Use of a multilayer release film also tends to be less costly than use of the traditionally used monolayer release films because the raw materials used in many multilayer films are less costly. For example, many 2-layer films (e.g., various films having a polymethylpentene containing release layer and a polyamide 6 containing enhancement layer), which have physical properties at least as suitable as the traditionally used fluoropolymer monolayer films, may be manufactured at a fraction of the cost.

The temperature at which the release film is used preferably is not greater than the temperatures at which the enhancement and release layers are heat stable. Typically, curing and molding processes are conducted at a temperature of at least about 120° F. (about 50° C.), and more typically at least about 250° F. (about 120° C.). In fact, the temperatures used for high-temperature molding and curing processes are often much greater, i.e., at least about 350° F. (about 180° C.), more typically from about 350° F. to about 500° F. (about 180 to about 260° C.), still more typically from about 350 to about 450° F. (from about 180 to about 230° C.), and most typically from about 350 to about 400° F. (from about 180 to about 205° C.). Thus, in many embodiments of this invention, the enhancement and release layers are heat stable at a temperature of at least about 350° F. (about 180° C.), more preferably at least about 375° F. (about 190° C.), and even more preferably at least about 400° F. (about 205° C.). And, in some embodiments, the enhancement and release layers preferably are heat stable at even greater temperatures, i.e., at least about 425° F. (about 220° C.) or at least about 450° F. (about 230° C.). A layer is "heat stable" if it does not degrade or incur significant changes to its physical properties (e.g., tensile strength, tear strength, and elongation) which make it unuseable at the temperature of the particular molding or curing application.

The composition of the enhancement layer may vary widely, depending on the application. As discussed above, the composition of the enhancement layer is different from the release layer and is chosen so that it provides desired qualities to the release film that the release layer lacks. Preferably, the enhancement layer comprises a thermoplastic resin. The molecular weight of the thermoplastic resin may vary widely, and is preferably from about 5,000 to about 100,000, and more preferably from about 10,000 to about 50,000.

The thermoplastic resin may comprise, for example, a polyether, polyamide, polyurethane, polyolefin, polystyrene, polyacrylic, polyvinyl, polycarbonate, polyimide, polysiloxane, polyketone, fluoropolymer, and/or ionomer. The more preferred materials typically are polyesters, polyethers, polyamides, polyolefins, and/or polystyrenes, with polyamides often being the most preferred.

Examples of often suitable polyolefins include polymethylpentene, polypropylene, polybutene, medium density polyethylene, high density polyethylene, linear low density polyethylene, and fractional melt polyethylene. The most preferred polyolefins often are polypropylene and polymethylpentene.

Examples of often suitable polyvinyls include polyvinylidene chloride, ethylene/vinyl alcohol copolymer, ethylene/vinyl acetate copolymer, and propylene/vinyl chloride copolymer.

Examples of often suitable polyamides include aliphatic polyamides formed by the reaction of diamines and diacids, such as poly(hexarnethylene adipamide) ("polyamide 6,6" or "nylon 6,6"), poly(hexamethylene sebacamide) ("polyamide 6,10" or "nylon 6,10"), poly(heptamethylene pimelamide) ("polyamide 7,7" or "nylon 7,7"), poly (octamethylene suberamide) ("polyamide 8,8" or "nylon 8,8"), poly(hexamethylene azelamide) ("polyamide 6,9" or "nylon 6,9"), poly(nonamethylene azelamide) ("polyamide 9,9" or "nylon 9,9"), poly(decamethylene azelamide) ("polyamide 10,9" or "nylon 10,9"), polyhexamethylene dodecanamide ("polyamide 6,12" or "nylon 6,12"), and the like. Other useful polyamides include those formed by polymerization of amino acids and derivatives thereof (e.g., lactams). Examples of such polyamides include poly(4-aminobutyric acid) ("polyamide 4" or "nylon 4"), poly(6-aminohexanoic acid) ("polyamide 6" or "nylon 6" or "poly (caprolactam)"), poly(7-aminoheptanoic acid) ("polyamide 7" or "nylon 7"), poly(8-aminoocatanoic acid) ("polyamide 8" or "nylon 8"), poly(9-aminononanoic acid) ("polyamide 9" or "nylon 9"), poly(10-aminodecanoic acid) ("polyamide 10" or "nylon 10"), poly(11-aminoundecanoic acid) ("polyamide 11" or "nylon 11"), poly(12-aminododecanoic acid) ("polyamide 12" or "nylon 12"), and the like. The polyamide may also be, for example, a copolymer formed from recurring units of the above referenced polyamides. These include, for example, caprolactam/hexamethylene adipamide copolymer ("polyamide 6/6,6" or "nylon 6/6,6"), hexamethylene adipamide/caprolactam copolymer ("polyamide 6,6/6" or "nylon 6,6/6"), trimethylene adipamide/hexamethylene azelaiamide copolymer ("polyamide trimethyl 6,2/6,2" or "nylon trimethyl 6,2/6, 2"), hexamethylene adipamide/hexamethylene-azelaiamide/caprolactam copolymer ("polyamide 6,6/6,9/6" or "nylon 6,6/6,9/6"), and the like. The polyamide may also be, for example, an aliphatic/aromatic polyamides. Examples of such polyamides include poly(hexamethylene isophthalamide), poly(2,2,2-trimethyl hexamethylene terephthalamide), poly(m-xylylene adipamide), poly(p-xylylene adipamide), poly(hexamethylene terephthalamide), and poly(dodecamethylene terephthalamide). The most preferred polyamides for use in this invention are typically polyamide 6; polyamide 6,6/6; and polyamide 6/6,6.

The thermoplastic resin may be present in the enhancement layer as, for example, a homopolymer, a block copolymer, a random copolymer, or a blend thereof. In one preferred embodiment, the thermoplastic resin is a block copolymer or a random copolymer of different polymers having hard and soft segments or domains in the polymer molecule or compound. The soft regions provide rubber like elastomeric properties, while the hard regions act as mechanical cross-links, tying down the rubbery sections. At processing temperatures, the hard segments melt or soften to yield a molten plastic that can be easily processed by injection molding, extrusion, etc. In some particularly preferred embodiments, the enhancement layer comprises a copolymer comprising a polyamide and a polyester.

The enhancement layer also may contain a wide variety and amount of additives to adjust various properties of the layer. Typically, if such additives are used, each makes up from about 0.01 to about 5% by weight of the layer. Such additives may include, for example, a heat stabilizer, an antioxidant, and/or a colorant.

Heat stabilizers and/or antioxidants may be added to ensure that the layer retains its physical properties and does not degrade at high temperatures or in highly oxidative environments. Copper iodide, for example, is a suitable heat stabilizer for many polyamide layers. Selection of an appropriate heat stabilizer and/or antioxidant for a particular enhancement layer composition is within the scope of knowledge of those having ordinary skill in the art. See, e.g., John H. Briston, *Plastics Films* at pp. 420–21 & 424 (co-published by Longman Scientific and Technical and John Wiley and Sons, 3d ed. 1988) (incorporated herein by reference).

Preferably, if a colorant is present in the release film, it is present in the enhancement layer, but not in the release layer which is contacted with the resin material. This helps to reduce the risk of contamination to the resin material by the colorant. Suitable colorants include dyes and pigments. Examples of often suitable dyes include azo dyes, anthraquinone dyes, xanthene dyes, azine dyes, fluorescent dyes, brilliant sulfoflavine, solvent orange 60, basic triphenylmethane dyes, quinoline yellows, and combinations thereof. Examples of often suitable pigments include titanium dioxide, iron oxides, cadmiums, chrome yellows, molybdate oranges, chromium oxide greens, iron blue, monoazo pigments, disazo pigments, disazo condensation pigments, quinacridone pigments, dioxanzine violet, vat pigments, perylene pigments, thionindigo pigments, phthalocyanine pigments, tetrachloroisoindolinones, and combinations thereof.

In a particularly preferred embodiment, the colorant comprises 2 components, each making up from about 25 to about 75% (most preferably about 50%) by weight of the colorant. The first component preferably comprises Macrolux Red EG (Bayer A G, Leverkusen, Germany), and more preferably consists of Macrolux Red EG and a polyamide. In the most preferred embodiment, about 7% of the first component consists of Macrolux Red EG and about 93% of the first component consists of a polyamide (e.g., polyamide 6 or polyamide 6/6,6). The second component preferably comprises iron oxide, and more preferably consists of iron oxide and a polyamide. In the most preferred embodiment, about 10% of the second component consists of iron oxide, and about 90% of the second component consists of a polyamide (e.g., polyamide 6/6,6 or polyamide 6). Preferably, from about 1 to about 5% (most preferably, about 2.5%) by weight of the enhancement layer consists of the two-component colorant.

The composition of the first release layer may vary widely, depending on the application. The first release layer is typically the portion (and most preferably, the only portion) of the release film that comes into contact with the article containing the resin material being molded or cured. Normally, the surface of the article is formed by the resin material, although, as noted above, a portion of the surface (or even the entire surface in some instances) may be formed by another material (e.g., copper foil, stainless steel, aluminum, etc.). Preferably, the first release layer consists essentially of a material which is releasable from surface formed by the resin material. Even more preferably, the first release layer consists essentially of a material which is releasable from any surface of the article which comes into contact with the first release layer. A material is "releasable" from a surface if the material may be removed from the surface without significant tearing or leaving a significant amount of residue on the surface.

The examples of suitable compositions provided above with respect to enhancement layers are often suitable for release layers, provided that they are releasable from the surface of the resin material being molded or cured. The resin preferably has a melt flow rate of from about 0.5 to about 200 grams per 10 minutes at 260° C. under a 5 Kg weight (and, more preferably, of from about 20 to about 28 grams per 10 minutes at 260° C. under a 5 Kg weight), as measured by ASTM D1238 (as defined by the American Society of Testing Materials). In a particularly preferred embodiment, the first release layer comprises a fluoropolymer, polyester, and/or polyolefin, with polyolefin (e.g., polymethylpentene, polypropylene, polybutene, medium density polyethylene, high density polyethylene, linear low density polyethylene, and fractional melt polyethylene) being most preferred. As with the enhancement layer, it should be recognized that the polymeric material in the release layer may be present as, for example, a homopolymer, an elastomer, a block copolymer, a random copolymer, or a blend thereof.

In a particularly preferred embodiment, the release layer comprises polymethylpentene. The polymethylpentene may be a polmethylpentene homopolymer or a copolymer comprising polymethylpentene. Of these, particularly preferred polymethylpentenes include 4-methyl-1-pentene homopolymers and copolymers comprising 4-methyl-1-pentene. Copolymers of 4-methyl-1-pentene often most preferably comprise 4-methyl-1-pentene with another α-olefin, especially an α-olefin having from 2 to about 20 carbon atoms (e.g., 1-butene, ethylene, propylene, 1-hexene, 1-octene, 1-decene, 1-tetradecane, or 1-octadecene). Preferably, at least about 85 mole % (and, more preferably, at least about 90%) of the copolymer consists of methylpentene units.

As with the enhancement layer, the release layer may contain various additives to adjust its properties. Typically, each such additive makes up from about 0.01 to about 0.5% by weight of the release layer. Such additives may include, for example, a heat stabilizer (as described above with respect to the enhancement layer), an anti-oxidant (as described above with respect to the enhancement layer), a release agent, and/or an antistatic agent.

As briefly discussed above, a "release agent" is a compound which enhances the release properties of the release layer by reducing the surface tension of the layer. For example, the release properties for release layers containing polymethylpentene often may be enhanced by including Teflon in the layer. Other examples of often suitable release agents include siloxanes, silicones, diethylene glycol monostearate, hydrogenated castor oil, stearic acid, oleic acid, zinc stearate, calcium stearate ethylene bis (stearamide), oleyl palmitamide, microcrystalline wax, paraffin wax, carnauba wax, spermaceti wax, cellophane, cellulose acetate, sodium alginate, and combinations thereof.

An antistatic agent often is added to the release layer if the release film is going to be used in antistatic environments (e.g., clean rooms). Without the addition of such agents, many release layers (such as those comprising fluoropolymers) tend to carry an electronic charge on their surfaces. This can be detrimental to nearby electronic equipment when such films are used in antistatic environments. Antistatic agents reduce the dielectric strength of the release layer, thereby decreasing the ability of the release layer to carry an electric charge. Examples of often suitable antistatic agents include, for example, 3-laurel amide propyl(3-methyl ammonium methylsulfate), quaternary ammonium, polyamine resin, quaternized fatty amine condensate, amine condensate, nonyl phenol ethylene oxide, nitrogenous polymer, and combinations thereof.

In a preferred embodiment of this invention, the enhancement layer is sandwiched between two release layers. If the compositions of the two release layers are different (or if there is only one release layer), the release film preferably is labeled so that the user knows which side is to be placed into contact with the resin material to be molded or cured.

In a particularly preferred embodiment of this invention, the release film comprises an enhancement layer sandwiched between two release layers having the same composition. This configuration is sometimes especially resistant to the layers coming apart because there tends to be less shifting between the three layers compared to a configuration in which the two release layers have different compositions. In addition, such a configuration is user friendly because it allows the user to contact the resin material with either side of the release film.

If the release film has a release layer which tends to come apart from the enhancement layer during storage or use, the release film preferably has a tie layer sandwiched between the release layer and enhancement layer. Likewise, if the release film has two release layers which tend to come apart from the enhancement layer, there preferably is a tie layer between the enhancement layer and both release layers. The composition of the tie layer may vary widely. Preferably, the tie layer has greater affinities for the enhancement and release layers than the affinity between the enhancement layer and release layer. For example, the integrity of a release film having a polyamide-containing enhancement layer and a polymethylpentene-containing release layer often may be enhanced by using an appropriate tie layer between the enhancement and release layers. Such a tie layer may comprise, for example, polypropylene, modified polypropylene, polyethylene, and/or modified polyethylene. As used herein, a "modified polymer" is a polymer wherein some or all of the substituent radicals of the polymer are replaced by another chemical entity or entities, resulting in a change of one or more properties of the polymer without destroying its structural identity. In a particularly preferred embodiment, a modified polymer used in accordance with this invention is a polymer modified by a carboxylic acid (e.g., acrylic acid, maleic acid, fumaric acid, tetrahydrophthalic acid, itaconic acid, citraconic acid, crotonic acid, isocrotonic acid, etc.) or a derivative of a carboxylic acid (e.g., a halide, amide, imide, anhydride, ester, etc.). Typically, the most preferred modified polypropylenes are anhydride modified polypropylenes, the most preferred modified polyethylenes are anhydride modified polyethylenes, and the most preferred modified copolymers of polypropylene and polyethylene are anhydride modified copolymers. As with the enhancement and release layers, it should be recognized that the polymeric material in the tie layer may be present as, for example, a homopolymer, an elastomer, a block copolymer, a random copolymer, or a blend thereof.

In a particularly preferred embodiment of this invention, the tie layer comprises (i) polypropylene or modified polypropylene (most preferably, anhydride modified polypropylene), and (ii) polyethylene or modified polyethylene (most preferably, anhydride modified linear low density polyethylene). It has been found in accordance with this invention that release films having such tie layers tend to exhibit superior bubble stability during manufacturing and superior tear resistance over release films having a homopolymer tie layer, such as a tie layer consisting of a polypropylene homopolymer or a modified polypropylene homopolymer. See Example 1. The concentration of the polypropylene, modified polypropylene, polyethylene, and/or modified polyethylene in the tie layer may vary widely. Preferably, from about 1 to about 99 mole % of the tie layer consists of polypropylene (or modified polypropylene), with the remainder preferably consisting of polyethylene (or modified polyethylene). Even more preferably, from about 55 to about 85 mole % (still more preferably from about 60 to about 80 mole %, and most preferably about 70 mole %) of the tie layer consists of polypropylene (or modified polypropylene), with from about 15 to about 45 mole % (still more preferably, from about 20 to about 40 mole %, and most preferably the remainder) of the tie layer consisting of polyethylene (or modified polyethylene). In another preferred embodiment, at least 70% of the tie layer consists of polypropylene or modified polypropylene.

The thickness of the release film may vary widely, depending on the application. For most applications, the preferred thickness ranges from about 13 to about 2540 $\mu$m (i.e., from about 0.5 to about 100 mils), more preferably from about 13 to about 1270 $\mu$m (i.e., from about 0.5 to about 50 mils), and most preferably from about 13 to about 178 $\mu$m (i.e., from about 0.5 to about 7 mils). While such thicknesses are preferred as providing a readily flexible film, other film thicknesses may be used to satisfy a particular need.

The ratio of the thickness of the release layer(s) verses the enhancement layer may vary widely. The proper ratio depends on the desired extent to which the properties of the release layer(s) are to be altered by the enhancement layer (s). An enhancement layer may vary from about 1 to about 99% (more preferably from about 40 to about 60%) of the total thickness of the release film. The thickness of any release layer may vary from about 1 to about 99% (more preferably from about 5 to about 30%, and still more preferably from about 10 to about 25%) of the thickness of the total release film. The thickness of any tie layer preferably is no greater than about 20% of the total thickness of the release film. In some embodiments of this invention, the thickness of any tie layer preferably is from about 10 to about 20% (more preferably from about 10 to about 15%, and most preferably about 14%) of the total thickness of the release film. In other embodiments, the thickness of any tie layer preferably is no greater than about 5% of the total thickness of the release film.

The preferred properties of the release film may vary widely, depending on the application. The tensile and tear strengths (as measured by ASTM D882 and ASTM D1004, respectively) should be sufficient so that the release film will withstand normal handling. The elongation at break (as measured by ASTM D882) should be sufficient so that, at the thicknesses and pressures used, the film will stretch to conform to the structure being molded or cured. For a typical resin curing or molding method, the release film:

(a) has a tensile strength in the machine direction which preferably is no less than about 4,000 psi;

(b) has a tensile strength in the transverse direction which preferably is no less than about 2,900 psi;

(c) has a tear strength which preferably is at least about 560 lbs/mil;

(d) has an elongation at break in the machine direction which preferably is no less than about 250%; and (e) has an elongation at break in the transverse direction which preferably is no less than about 350%; and (f) is heat stable at a temperature of at least about 350° F. (about 180° C.), more preferably at least about 375° F. (190° C.), and most preferably at least about 400° F. (about 205° C.).

The release film may be produced by conventional methods useful in producing multilayer films, including extrusion lamination and multilayer extrusion techniques. Such processes are generally known in the art.

Under the lamination technique, the release film is formed from pre-fabricated layers by methods which are well known in the art. The basic methods used in film laminating techniques are wet combining, heat reactivating, and fusion. Wet combining and heat reactivating techniques employ adhesives and may be used if the layers do not readily form interfacial adhesion. Fusion, which is a method of laminating two or more layers using heat and pressure without an adhesive, preferably is used if the layers readily form interfacial adhesion. Typically, the layers of the release film are positioned on one another, and the combination is passed through the nip of a pair of heated laminating rollers. Suitable lamination techniques are well described in the literature. See, e.g., Michael C. Y. Niu, *Resin Airframe Structures—Practical Design Information and Data*, pp. 176–237 (Conmilt Press, Ltd, Hong Kong, 1992) (incorporated herein by reference); Zeke Smith, *Understanding Aircraft Resin Construction*, pp. 14-1 to 14-10 (Aeronaut Press, Napa, FL 1996) (incorporated herein by reference); Habermann, U.S. Pat. No. 3,355,347 (incorporated herein by reference).

Under the multilayer extrusion technique, the materials for the release, enhancement, and tie layers (as well as any other layers which optionally may be included in the release film) are fed into infeed hoppers of extruders. If each layer consists of a different material, then a separate extruder preferably handles the material for each of the layers. If, however, more than one layer of the film consists of the same material, that material may optionally be extruded into its respective layers from a single extruder. For example, if both exterior layers consist of polymethylpentene, the polymethylpentene may be extruded into the two exterior layers from a single extruder, with the extrudate being split into the respective individual layers after it passes through both the single extruder and a feedblock, and then emerges from the multilayer extrusion die. Preferably, if the release film comprises a tie layer(s), at least three extruders are used, one being for the enhancement layer, one for the tie layer(s), and one for the release layer(s). The melted and plasticated streams from the individual extruders are fed into a single manifold multilayer extrusion die. While in the die, the layers are juxtaposed and combined, then emerge from the die as a single multiple layer film of polymeric material. In a preferred 5-layer embodiment of this invention (e.g., where the two release layers are polymethylpentene, the enhancement layer is polyamide, the two tie layers consist of anhydride modified polypropylene and anhydride modified linear low density polyethylene).

In a particularly preferred embodiment of this invention, the release film is made using blown film multilayer extrusion. Under this technique, the film is formed by a blown film apparatus which includes a multi-manifold circular die head having concentric circular orifices. A multilayer release film having an enhancement layer sandwiched between two release layers is formed by coextruding a molten enhancement layer through a circular die, and a molten release layer on each opposite side of the enhancement layer through additional circular dies concentric with the first circular die. A gas (preferably air) is blown through a jet which is concentric with the circular dies; this forms a bubble expanding the enhancement and release layers. The bubble is then collapsed upon itself into a pair of multilayer films attached at two opposite edges. Usually the pair of attached multilayer films are cut apart and separated into a pair of multilayer films, which may then be rolled up and stored. Suitable multilayer extrusion techniques are well described in the literature. See, e.g., John H. Briston, *Plastics Films*, pp. 331–35 (co-published by Longman Scientific and Technical and John Wiley and Sons, 3d ed.1988) (incorporated herein by reference).

One advantage of coextruded films is the formation of a multilayer film in a one-step process by combining molten layers into a unitary film structure. To produce a multilayer film by a multilayer extrusion process, the constituents used to form each of the individual films preferably are compatible with the film extrusion process. The term "compatible" in this respect means that the film-forming compositions used to form the films have melt properties which are sufficiently similar so as to allow multilayer extrusion. Melt properties of interest include, for example, melting points, melt flow indices, apparent viscosity, as well as melt stability. Such compatibility helps to ensure that the multilayer film has good adhesion and relatively uniform thickness across the width of the film being produced. As is known in the art, film-forming compositions which are not sufficiently compatible to be useful in a multilayer extrusion process frequently produce films having poor interfacial lamination, poor physical properties, and poor appearance. One skilled in the art can readily weigh the above-noted compatibilities to select polymers having desirable physical properties and determine the optimal combination of relative properties in adjacent layers without undue experimentation. If a multilayer extrusion process is used, the constituents used to form the multilayer film preferably are compatible within a relatively close temperature range, thereby permitting extrusion through a common die.

The release film used in this invention preferably is not significantly oriented in any direction. The compositions of the release layer(s), enhancement layer(s), and any tie layer(s) are instead chosen to provide the desired properties to the release film without the film being oriented. This allows the film to be manufactured without incurring the added manufacturing costs associated with a film-stretching step(s).

It should be recognized that when this specification describes a structure (e.g., a layer) comprising a certain polymeric material, that material may be present in the structure as, for example, a homopolymer; a component of a block copolymer; a component of a random copolymer; a component of an elastomer; or a component of a blend of, for example, homopolymer(s), block copolymer(s), random polymer(s), and/or elastomer(s).

EXAMPLES

The following examples further illustrate and explain the invention. The invention, however, should not be considered as being limited to the details of these examples.

Example 1

Two multilayer release films having the following general configurations (from top to bottom) were prepared:

1. Release layer #1. Polymethylpentene (MX002, Mitsui Petrochemical Industries, Ltd., Tokyo, Japan). The polymethylpentene had a melt index of from about 20 to about 28 grams per 10 minutes at 260° C. under a 5 Kg weight (as measured by ASTM D1238), and a melt point of about 450° F. (about 230° C.). This layer was roughly 20% of the release total thickness of the release film.
2. Tie layer #1. This layer was roughly 5% of the total thickness of the release film.
3. Enhancement layer. Film grade polyamide 6 (Grade B36, BASF, Ludwigshafen, Germany), containing approximately 80 ppm copper iodide. The polyamide had a molecular weight of from about 10,000 to about 50,000, a melt index of about 3.6 grams per 10 min, and a melt point of about 414° F. (about 212° C.). This layer was roughly 50% of the total thickness of the release film.
4. Tie layer #2. Same composition and thickness as tie layer #1.
5. Release layer #2. Same composition and thickness as release layer #1. The only difference between the two films was the composition of the tie layers. The tie layers in Film #1 consisted of an anhydride modified copolymer of polypropylene and polyethylene (Admer QF551A grade, Mitsui), having a melt index of 5.7 grams per 10 minutes. The tie layers in Film #2 consisted of an anhydride modified homopolymer of polypropylene (Admer QB510A, Mitsui).

A monolayer polymethylpentene (MX002, Mitsui) release film (Film #3) also was prepared for comparison purposes.

Each of the films exhibited comparable release characteristics. Table 1 compares the tensile strengths, tear strengths, and elongation at break for these films. As Table 1 shows, the tensile strengths, tear strengths, and elongations at break of the multilayer films were superior to the monolayer film.

TABLE 1

Comparison of Tensile and Tear Strengths of Various Release Films

|  | Film | | |
| --- | --- | --- | --- |
|  | 1 | 2 | 3 |
| Tensile Strength (psi) (Transverse Direction) | 11,400 | 5,300 | 2,900 |
| Tensile Strength (psi) (Machine Direction) | 12,000 | 8,300 | 4,000 |
| Tear Strength (lbs/mil) | 1,030 | 690 | 560 |
| Elongation at Break (%) (Machine Direction) | 510 | 450 | 220 |
| Elongation at Break (%) (Transverse Direction) | 520 | 480 |  |

The above tensile strengths were measured using ASTM D882, and the tear strengths were measured using ASTM D 1004. No accurate measurement for the elongation at break in the transverse direction for the monolayer polymethylpentene release film could be obtained due to the low tear strength of the film.

Example 2

A release film having the following configuration (from top to bottom) was prepared:

1. Release layer # 1. Polymethylpentene (MX002, Mitsui). This layer was roughly 13% of the total thickness of the release film.
2. Tie layer #1. A copolymer having the following composition: 70 mole % anhydride modified polypropylene, with a melt index of 3.5 grams per 10 minutes (Bynel 50E571, E.I. duPont deNemours & Co., Wilmington, Del.); and 30 mole % anhydride modified linear low density polyethylene, with a melt index of 1.1 grams per 10 minutes (Bynel 41E558, DuPont). This layer was roughly 14% of the total thickness of the release film.
3. Enhancement layer. Film grade polyamide 6 (Grade B36, BASF), containing approximately 150 ppm copper iodide. This layer was roughly 46% of the total thickness of the release film.
4. Tie layer #2. Same composition and thickness as tie layer #1.
5. Release layer #2. Same composition and thickness as release layer #1.

The total thickness of the release film was 1 mil (25 μm). The film had a tensile strength in the transverse direction of 9667 psi, a tensile strength in the machine direction of 9711 psi, an elongation at break in the transverse direction of 467%, an elongation at break in the machine direction of 403%, a yield strength in the transverse direction of 3778 psi, and a yield strength in the machine direction of 4122 psi.

Example 3

Other tie layer compositions besides those shown in Examples 1 and 2 may be used to prepare a release film having a polyamide 6 enhancement layer and a polymethylpentene release layer. For example, applicants have successfully prepared such a film using a tie layer consisting of anhydride modified polypropylene (Bynel 50E571, DuPont). Applicants have also prepared such a film using a tie layer consisting of anhydride modified polypropylene with a melt index of 3.0 grams per 10 minutes (Admer QB510A, Mitsui). As further illustration, applicants have prepared such a film using a tie layer consisting of a copolymer of anhydride modified polypropylene (Admer QB510A, Mitsui) and anhydride modified linear low density polyethylene with a melt index of 2.0 grams per 10 minutes (Admer AT1048A, Mitsui).

Example 4

Applicants have prepared several multiple-layer release films which have the following configuration (from top to bottom):

1. Release layer #1. Low density polyethylene, having a melt index of 2.0 grams per 10 minutes (PE1122, Chevron Chemical Co., San Francisco, Calif.).
2. Tie layer #1.
3. Enhancement layer. Film grade polyamide 6 (Grade B36, BASF), containing approximately 150 ppm copper iodide.
4. Tie layer #2. Same composition and thickness as tie layer #1.
5. Release layer #2. Same composition and thickness as release layer #1.

In one release film, the tie layers consisted of modified linear low density polyethylene (Admer AT1048A, Mitsui). In another release film, the tie layers consisted of anhydride modified linear low density polyethylene (Bynel 41E558, DuPont). And in yet another release film, a layer consisting of low density polyethylene (PE1122, Chevron) was substituted for each tie layer.

These release films have generally been found to be suitable for curing or molding resin materials only at temperatures below about 350° F. (about 180° C.), i.e., preferably at temperatures which are no greater than about 300° F. (about 150° C.), and even more preferably at temperatures which are no greater than about 250° F. (about 120° C.). This is primarily due to the fact that the low density polyethylene is not heat stable at a temperature of about 350° F. (about 180° C.) or greater.

Example 5

A composite panel was fabricated in an autoclave using a vacuum bagging apparatus as generally shown in FIG. 1. The resin 8 was a prefabricated composite material consisting of epoxy resin with a carbon fabric reinforcement (F583 3K, Hexcel/Ciba Corp., Pleasanton, Calif.). Four layers of this composite material were placed on a release-coated 0.045 inch (0.114 cm), stainless steel caul sheet 2. A 1 mil (25 μm) perforated release film 9 having the configuration described in Example 2 (Dahler, Airtech Int'l Inc., Huntington Beach, Calif.) was then placed on top of the resin material. A 10-ounce, non-woven polyester breather pad 5 (Airweave N10, Airtech) was placed on top of the release film, and then all of the layers were covered by a 2 mil (50 μm) vacuum bag 1 (SL850, Airtech) which was sealed to the caul sheet 2 by 0.12×0.5 inch (0.32×1.27 cm) sealant tape 3 (GS-213, Airtech).

To cure the resin material 8, the air inside the vacuum bag 1 was evacuated until a full vacuum (i.e., at least 27 inches Hg (91 kPa)) was achieved, and the pressure in the volume 7 above the apparatus was increased to 80 psi (550 kPa) using an $N_2$ atmosphere as the temperature was increased at about 2 to about 8° F. (about 1 to about 4.5° C.) per minute until the temperature was about 375° F. (about 190° C.). The vacuum, elevated pressure, and temperature were then maintained for about 4 hours. Afterward, the temperature was decreased at a rate of from about 2 to about 8° F. (about 1 to about 4.5° C.) per minute to about 1 50° F. (about 65° C.).

Following this process, the release film 9 was found to easily release from the resin material 8 without any detrimental effects being observed.

Example 6

Figure 2:
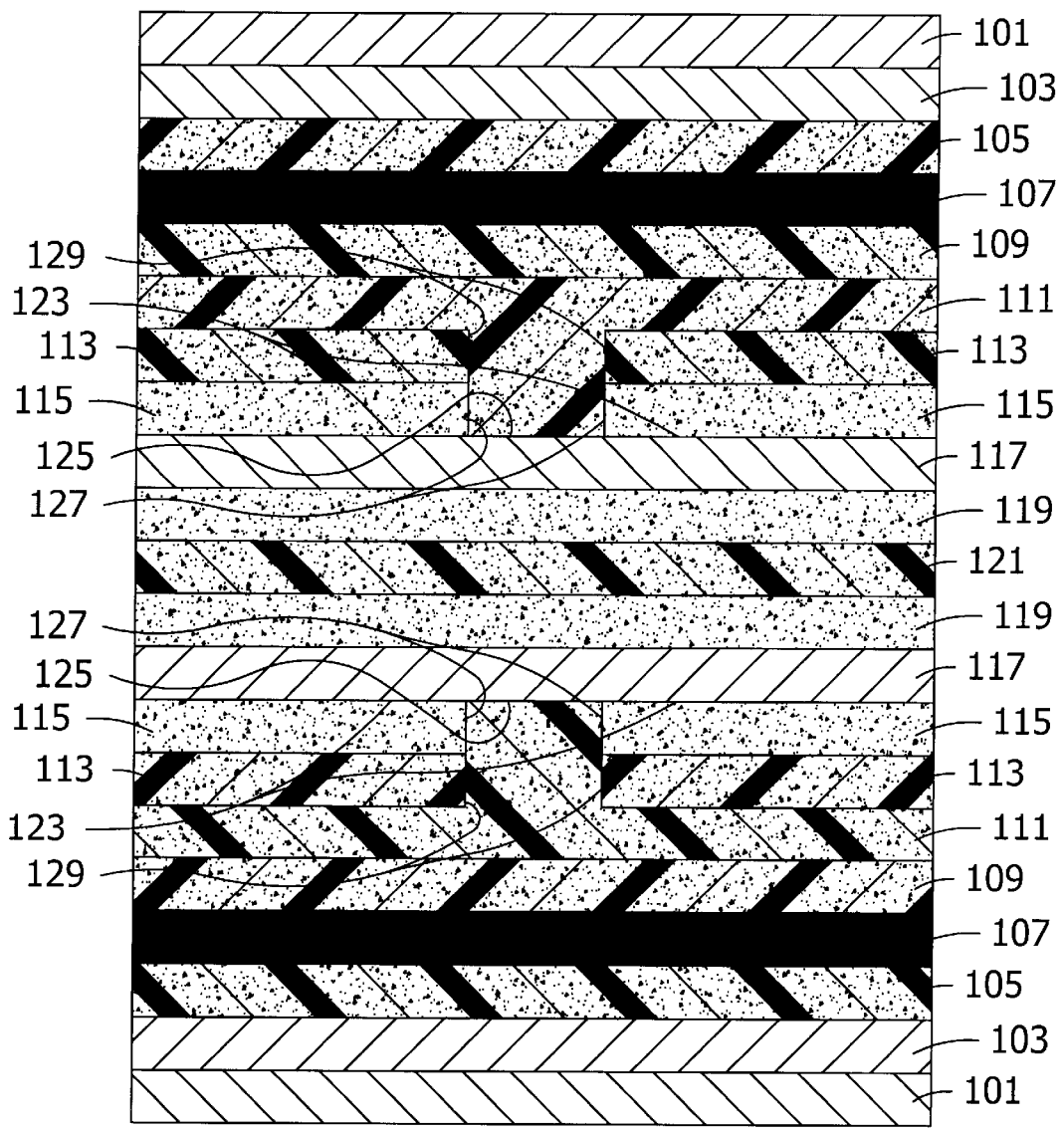
FIG. 2 illustrates an example of suitable contents that may be used between the press plates of a press cure apparatus to form a double-sided printed circuit board in accordance with one embodiment of the present invention.

A flexible, double-sided printed circuit board was fabricated using a press cure. The contents between the press plates 101 are shown in FIG. 2. The press plates 101 were each in contact with a metal caul sheet 103 (both steel and aluminum caul sheets 103 have been used), which allowed the contents to be more easily withdrawn from the press following the curing process. The next three inner layers from each of the press plates 101 consisted of a 10 to 20 mil (250 to 510 μm) thick polytetrafluoroethylene (Teflon) layer 105, a 20 mil (510 μm) thick beverage board 107, and a 5 mil (130 μm) thick polyethylene layer 109. These three layers, along with the caul sheets, helped to ensure that the resin material was flatly pressed by the press plates 101. The next inner layer from each of the press plates 101 was a 1 mil (25 μm) release film 111 having the configuration described in Example 2 (Dahler, Airtech). Between the two release films 111, was the resin material of the circuit board. The core of the circuit board was a double-sided base laminate having a 1 mil (25 μm) polyimide layer 121 (Kapton, DuPont) sandwiched between two 1 mil (25 μm) epoxy adhesive layers 119. These adhesive layers 119 had approximately 0.5 to 2 ounce (16 to 57 gram) copper foil 117 on their surfaces opposite the polyimide layer 121. This copper foil 117 formed the surfaces of the double-sided base laminate. Certain regions of the surface of this base laminate (i.e., regions 123) had a coverfilm (also called a "coverlay"), while other regions 125 did not. The coverfilm had two layers: a 1 mil (25 μm) thick epoxy adhesive layer 115 in contact with the copper foil 117, and a 1 mil (25 μm) thick polyimide layer 113 (Kapton, Dupont) having a surface in contact with the epoxy adhesive layer 115 and a surface in contact with the release film 111. Where no coverfilm existed on the surface of the base laminate (i.e., regions 125), the release films 111 extended to the copper foil 117. In doing so, the release films 111 also contacted end surfaces 127 of the epoxy adhesive layers 115 and end surfaces 129 of the polyimide layers 113 of the coverfilm.

To cure the resin material, the press plates 101 were moved toward each other to create pressure against the caul sheets 103 of approximately 500+/−5 psi (about 3450+/−35 kPa). While applying this pressure, the contents between the press plates 101 were heated at a rate of about 3 to about 5° F. (about 1.5 to about 3° C.) per minute until the temperature of the contents reached about 375° F. (about 190° C.), and then were held at that temperature and pressure for about 70 minutes. Afterward, the temperature was decreased back to room temperature at a rate of from about 5 to about 10 ° F. (about 2.5 to about 6° C.). After cooling, the pressure from the press plates 101 was released.

Following this process, the release film 111 was found to easily release from the copper foil 117 (at regions 125), epoxy adhesive layers 115 (at regions 127), and polyimide layers 113 without any detrimental effects being observed.

The above description of the preferred embodiment is intended only to acquaint others skilled in the art with the invention, its principles, and its practical application, so that others skilled in the art may adapt and apply the invention in its numerous forms, as may be best suited to the requirements of a particular use. The present invention, therefore, is not limited to the above embodiments, and may be variously modified.

We claim:

1. A method for molding or curing a resin material using a multilayer release film as a barrier at the surface of the resin material, the method comprising the surface of the resin material being in contact with the release film at a temperature of at least about 350° F. (about 180° C.),
   wherein the release film is non-oriented and comprises:
   (1) an enhancement layer which comprises a thermoplastic material; and (2) a first release layer which has a composition that is different from the enhancement layer, comprises a polymeric material, and is releasable from the resin material after the resin material is molded or cured.

2. The method of claim 1 wherein the resin material comprises a composite material.

3. The method of claim 1 wherein the resin material comprises a material selected from the group consisting of epoxy resin, vinyl ester resin, thermoset polyester resin, thermoplastic polyester resin, cyanate ester resin, phenolic resin, polyetherketone resin, polyether ether ketone resin, and bismaleimide resin.

4. The method of claim 1 wherein the enhancement layer comprises a material selected from the group consisting of polyester, polyether, polyamide, polyolefin, polyvinyl, polystyrene, polycarbonate, polyurethane, polyimide, polyketone, polysiloxane, and polyacrylic.

5. The method of claim 1 wherein the enhancement layer comprises a material selected from the group consisting of polyester, polyether, polyamide, polyolefin, and polystyrene.

6. The method of claim 1 wherein the enhancement layer comprises polyamide.

7. The method of claim 1 wherein the enhancement layer comprises polyamide and polyester.

8. The method of claim 1 wherein the first release layer comprises a material selected from the group consisting of polyester, polyolefin, and fluoropolymer.

9. The method of claim 1 wherein the first release layer comprises polyolefin.

10. The method of claim 1 wherein the first release layer comprises a material selected from the group consisting of polymethylpentene, polypropylene, polybutene, medium density polyethylene, high density polyethylene, and linear low density polyethylene.

11. The method of claim 1 wherein the first release layer comprises polymethylpentene.

12. The method of claim 1 wherein the release film further comprises a tie layer between the first release layer and the enhancement layer.

13. The method of claim 12 wherein the tie layer comprises a material selected from the group consisting of polyethylene, modified polyethylene, polypropylene, and modified polypropylene.

14. The method of claim 12 wherein the tie layer comprises a copolymer comprising a material selected from the group consisting of polyethylene, modified polyethylene, polypropylene, and modified polypropylene.

15. The method of claim 12 wherein the tie layer comprises polypropylene.

16. The method of claim 12 wherein the tie layer comprises an anhydride modified copolymer of polypropylene and polyethylene.

17. The method of claim 12 wherein the tie layer comprises (i) polypropylene or modified polypropylene, and (ii) polyethylene or modified polyethylene.

18. The method of claim 12 wherein the tie layer comprises a material selected from the group consisting of anhydride modified linear low density polyethylene and anhydride modified polypropylene.

19. The method of claim 12 wherein the tie layer comprises anhydride modified polypropylene and anhydride modified linear low density polyethylene.

20. The method of claim 12 wherein the first release layer comprises polymethylpentene, the enhancement layer comprises polyamide, and the tie layer comprises anhydride modified polypropylene and anhydride modified linear low density polyethylene.

21. The method of claim 1 wherein the release film further comprises a second release layer, the enhancement layer being between the first and second release layers.

22. The method of claim 1 wherein the method comprises the first release layer being in contact with the surface of the resin material at a temperature of at least about 375° F. (about 190° C.).

23. The method of claim 1 wherein the method comprises the first release layer being in contact with the surface of the resin material at a temperature of from about 350 to about 500° F. (about 180 to about 260° C.).

24. The method of claim 1 wherein the method comprises the first release layer being in contact with the surface of the resin material at a temperature of from about 350 to about 425° F. (about 180 to about 218° C.).

25. The method of claim 1 wherein the method comprises the first release layer being in contact with the surface of the resin material at a temperature of from about 350 to about 400° F. (about 180 to about 204° C.).

26. A method for molding or curing a resin material using a multilayer release film as a barrier at the surface of the resin material, the method comprising the surface of the resin material being in contact with the release film at a temperature of at least about 350° F. (about 180° C.), wherein the release film is non-oriented and comprises:
   a release layer which comprises polymethylpentene;
   an enhancement layer which comprises polyamide; and
   a tie layer which is sandwiched between the release layer and enhancement layer and comprises (i) polyethylene or modified polyethylene, and (ii) polypropylene or modified polypropylene.

27. A method for molding or curing a resin material using a multilayer release film as a barrier at the surface of the resin material, the method comprising contacting the resin material with the release film, wherein the release film is non-oriented and comprises 5 layers in the following order:
   a first release layer which comprises polymethylpentene;
   a first tie layer which comprises (i) polyethylene or modified polyethylene, and (ii) polypropylene or modified polypropylene;

an enhancement layer which comprises polyamide;

a second tie layer which comprises (i) polyethylene or modified polyethylene, and (ii) polypropylene or modified polypropylene; and a second release layer which comprises polymethylpentene.

28. A method for molding or curing a resin material using a multilayer release film as a barrier at the surface of the resin material, the method comprising contacting the resin material with the release film, wherein the release film is non-oriented and comprises:

a release layer which comprises polymethylpentene;

an enhancement layer which comprises polyamide; and a tie layer which is sandwiched between the release layer and enhancement layer and comprises an anhydride modified linear low density polyethylene and an anhydride modified polypropylene.

29. A non-oriented release film comprising 5 layers in the following order:

a first release layer which comprises polymethylpentene;

a first tie layer which comprises (i) polyethylene or modified polyethylene, and (ii) polypropylene or modified polypropylene;

an enhancement layer which comprises polyamide;

a second tie layer which comprises (i) polyethylene or modified polyethylene, and (ii) polypropylene or modified polypropylene; and a second release layer which comprises polymethylpentene.

30. The non-oriented release film of claim 29 wherein the enhancement layer further comprises a colorant, and the release layers do not comprise a colorant.

31. The non-oriented release film of claim 29 wherein the tie layers comprise polypropylene.

32. The non-oriented release film of claim 29 wherein the tie layers comprise an anhydride modified copolymer of polypropylene and polyethylene.

33. The non-oriented release film of claim 29 wherein from about 55 to about 85 mole % of the tie layers consists of polypropylene or modified polypropylene, and from about 15 to about 45 mole % of the tie layers consists of polyethylene or modified polyethylene.

34. The non-oriented release film of claim 29 wherein from about 60 to about 80 mole % of the tie layers consists of polypropylene or modified polypropylene, and from about 20 to about 40 mole % of the tie layers consists of polyethylene or modified polyethylene.

35. A non-oriented release film comprising:

a release layer which comprises polymethylpentene;

an enhancement layer which comprises polyamide; and a tie layer which is sandwiched between the release layer and enhancement layer and comprises anhydride modified linear low density polyethylene and anhydride modified polypropylene.

36. The non-oriented release film of claim 35 wherein the release film comprises 5 layers in the following order:

a first release layer which comprises polymethylpentene;

a first tie layer which comprises anhydride modified linear low density polyethylene and anhydride modified polypropylene;

an enhancement layer which comprises polyamide;

a second tie layer which comprises anhydride modified linear low density polyethylene and anhydride modified polypropylene; and a second release layer which comprises polymethylpentene.

* * * * *